United States Patent [19]

Cayment et al.

[11] Patent Number: 5,432,828
[45] Date of Patent: Jul. 11, 1995

[54] METHOD AND DEVICE FOR REPLACING AN ADAPTOR FOR PENETRATING THE VESSEL HEAD OF A NUCLEAR REACTOR

[75] Inventors: Michel Cayment, Saint Germain Du Plain; Michel Batistoni, Le Bourg, both of France

[73] Assignee: Framatome, Courbevoie, France

[21] Appl. No.: 213,016

[22] Filed: Mar. 15, 1994

[30] Foreign Application Priority Data

Mar. 15, 1993 [FR] France .................. 93 02955

[51] Int. Cl.$^6$ ........................................ G21C 13/00
[52] U.S. Cl. ........................ 376/260; 29/402.08
[58] Field of Search ............. 376/260, 307, 463; 29/402.07, 402.08, 890.031; 228/119

[56] References Cited

U.S. PATENT DOCUMENTS 3,240,514  3/1966  Bell et al. .................. 376/463
5,070,600  12/1991  Brew et al. ................. 376/260

FOREIGN PATENT DOCUMENTS 440353  8/1991  European Pat. Off. .
2069737  9/1971  France .

OTHER PUBLICATIONS

Kernergie, vol. 15, No. 8, Aug. 1972, p. 267.

*Primary Examiner*—Daniel D. Wasil
*Attorney, Agent, or Firm*—Pollock, Vande Sande & Priddy

[57] ABSTRACT

The replacement is performed from a repair area located above the convex face (1a) of the head. The adaptor to be replaced is machined, after dismounting its drive mechanism (13) and a thermal sleeve (4), by inserting an appropriate tool (14) via the upper end of the adaptor (3') to be replaced. Machining of the lower portion of the adaptor and of a portion of the weld of this adaptor, the machining of a narrow bevel in the weld of the adaptor to be replaced, reboring of the remaining portion of the adaptor to be replaced (3') inside the head (1), extraction of the adaptor, the installation, by cold shrink-fitting, of a replacement adaptor and the welding of the replacement adaptor are performed in succession.

10 Claims, 6 Drawing Sheets

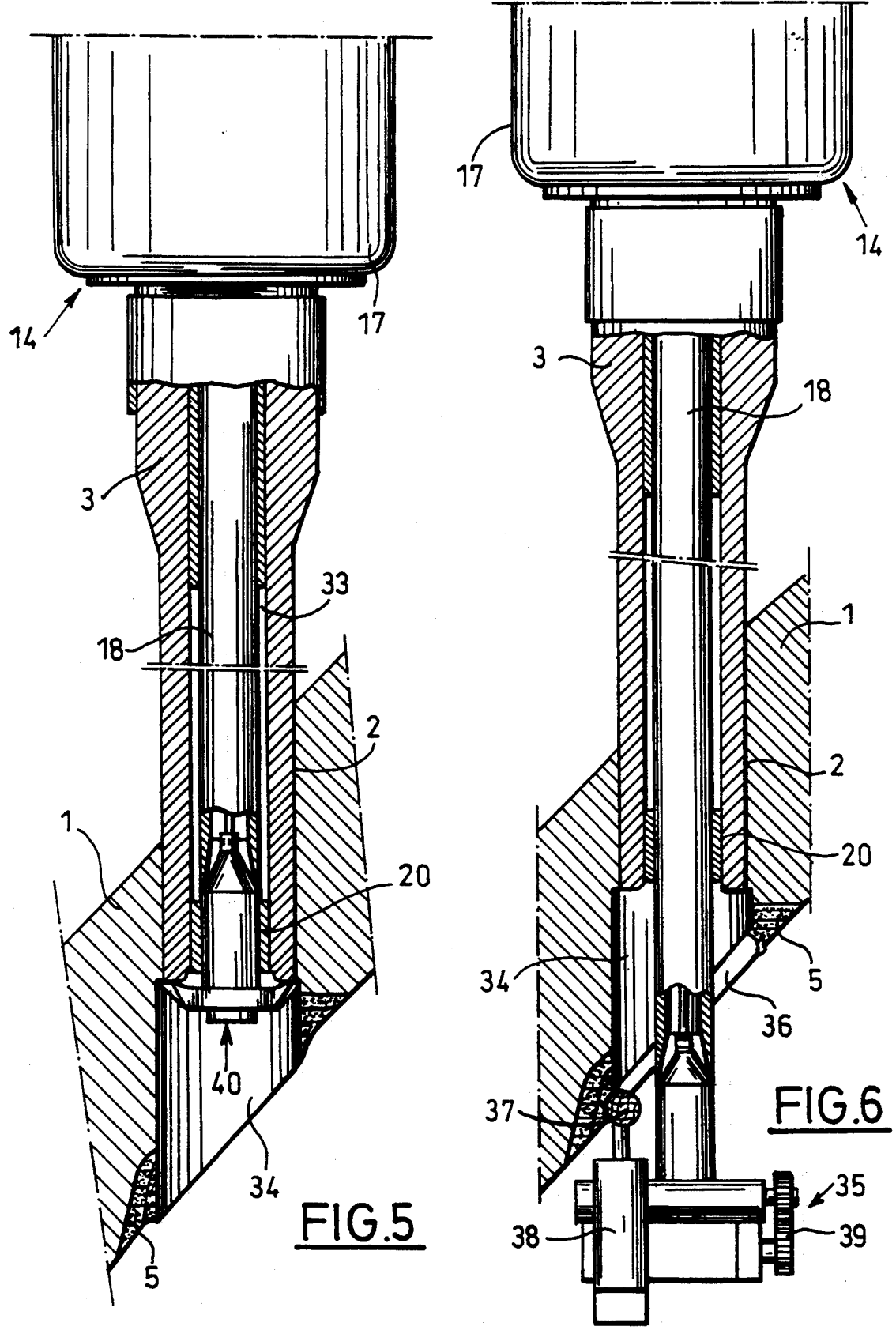

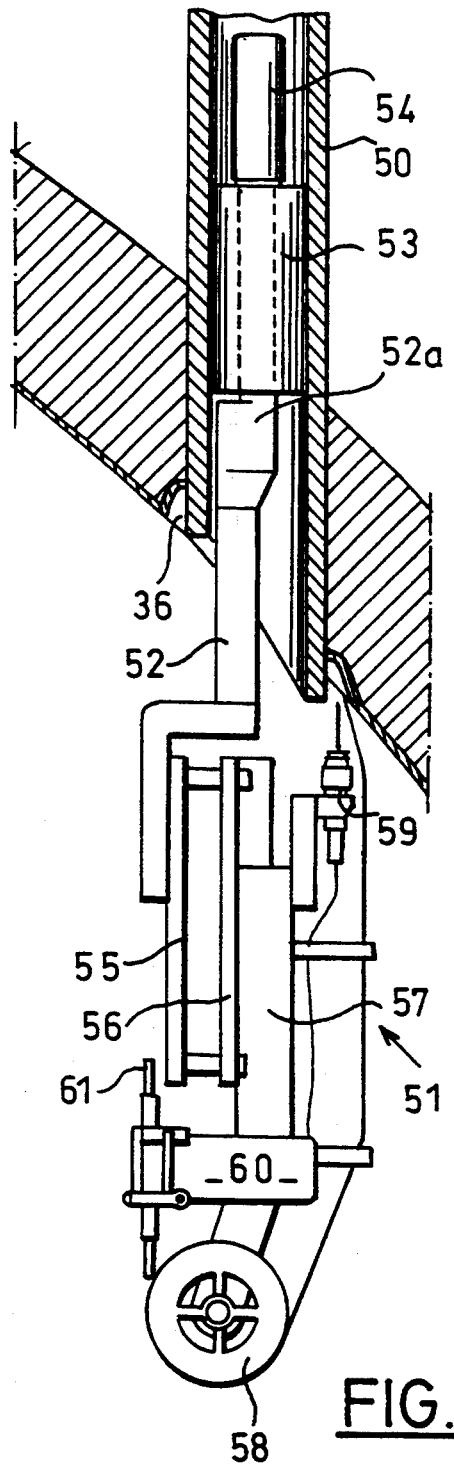
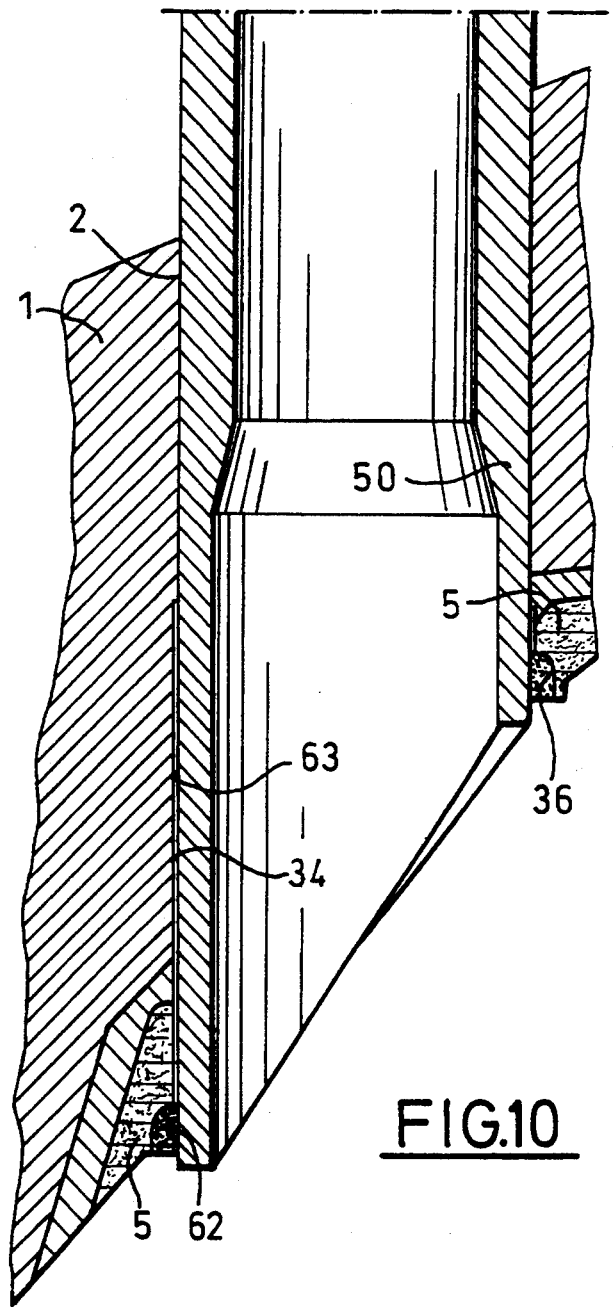
FIG.9
FIG.10

METHOD AND DEVICE FOR REPLACING AN ADAPTOR FOR PENETRATING THE VESSEL HEAD OF A NUCLEAR REACTOR

The invention relates to a method of replacing an adaptor for penetrating the vessel head of a nuclear reactor cooled by pressurized water.

Pressurized-water nuclear reactors generally include a vessel enclosing the core of the reactor which is submerged in pressurized water for cooling the reactor.

The reactor vessel of cylindrical general shape includes a head of hemispherical shape which can be attached to its upper portion.

The head is pierced with openings at each of which is fixed a tubular penetration part constituting an adaptor providing the passage and the actuation mechanism for moving a follower of a rod for controlling the reactivity of the core or a penetration passage for a means of measurement inside the core, such as a thermocouple column assembly. The tubular part is generally shrink-fitted inside the opening of the head and is fixed in a sealed manner by means of a weld, deposited in a bevel machined on the concave inner surface of the vessel head, around the penetration opening for the adaptor. To the end portion of each of the adaptors is fixed a mechanism for actuating the movement of a rod for controlling the reactivity of the core or a means for supporting a thermocouple column assembly.

Inside each of the adaptors for penetrating the vessel head providing the passage of a follower of a reactivity control rod is fixed, in a position coaxial in relation to the tubular adaptor and with a certain radial clearance, a thermal sleeve which includes a diametrically widened portion resting on a bearing surface located at the upper portion of the bore of the adaptor.

In order to increase the operational reliability and safety of nuclear reactors and to extend the lifetime of these reactors, the operators are obliged to carry out an increasing number of inspections on the various elements constituting the nuclear reactor.

For example, the state of the parts for penetrating the vessel head is inspected in order to be sure of the integrity of these parts, after a certain time of operating the reactor, in particular in the area where these tubular parts are welded to the vessel head.

These inspections and repairs are carried out during a shutdown of the nuclear reactor, the vessel head being dismounted and placed on an inspection and repair stand.

The head is placed on the inspection and repair stand in a position corresponding to its surface position, the convex external surface of the head facing upwards and the concave internal surface facing downwards.

The presence of defects in the adaptors, which may, in some cases, be constituted by cracks, can also be detected during hot pressure testing of the nuclear-reactor vessel.

In some exceptional cases, defects constituted by cracks penetrating the wall of the adaptor may be present.

In the case where defects are detected, it is necessary to carry out a repair, on the inspection and repair stand, before replacing the head in the service position on the nuclear-reactor vessel.

In some cases, in particular in the very rare case where a crack of an adaptor would be penetrating, it is necessary either to replace the vessel head completely or to replace the defective adaptor by a new adaptor.

Obviously the complete replacement of the head is an extremely expensive operation, one which requires having a complete head in reserve on the nuclear-reactor site.

The operation of replacing a defective adaptor by a new adaptor, which requires removal by machining of the lower portion of the adaptor to be replaced and of the weld for fixing the head, as well as welding of the replacement adaptor, is lengthy and tricky to perform, in particular on account of the fact that the internal surface of the head is highly radioactive.

Such a repair, which requires the installation of a protective structure, can turn out to be lengthy and expensive.

The object of the invention is therefore to provide a method of replacing an adaptor for penetrating the vessel head of a nuclear reactor, of rounded shape, disposed, after dismounting, so as to have a convex outer surface facing upwards and a concave inner surface facing downwards, each of the adaptors having a vertical disposition and being fixed in a penetration opening in the head by means of a weld in the vicinity of the concave inner surface and carrying an item of equipment resting on one end of the adaptor, this end projecting outside the head, the method consisting in machining a lower portion of the adaptor to be replaced, in the vicinity of the inner surface of the head, and at least one portion of the weld for fixing the adaptor, in extracting the adaptor to be replaced from the opening in the head, in inserting a replacement adaptor into the opening and fixing it therein, and in welding the replacement adaptor to the head, this method being able to be implemented in a simple manner and enabling the cost of the replacement operation to be reduced.

With this object in mind, the replacement is performed from a repair area located above the convex face of the head and at least one of the operations of machining the adaptor to be replaced after dismounting the item of equipment resting on its upper end and/or of welding the replacement adaptor is carried out by inserting an appropriate tool via the upper end of the adaptor.

In order to make the invention easier to understand, an embodiment of the method of replacing an adaptor of the vessel head of a pressurized-water nuclear reactor, according to the invention, will now be described by way of non-limiting example, with reference to the hereinattached figures.

FIG. 5 is a view, in side elevation and in cross-section, of the machining device represented in FIG. 4 after completing an operation for machining the lower portion of the adaptor to be replaced.

FIG. 6 is a view, in elevation and in cross-section, of a device for machining a welding bevel in the service position inside an adaptor to be replaced.

FIG. 9 is a view, in elevation and in cross-section, of a variant of the welding machine represented in FIG. 8.

FIG. 10 is a view, in cross-section, of the lower portion of a replacement adaptor welded to the head of a vessel.

Figure 1:
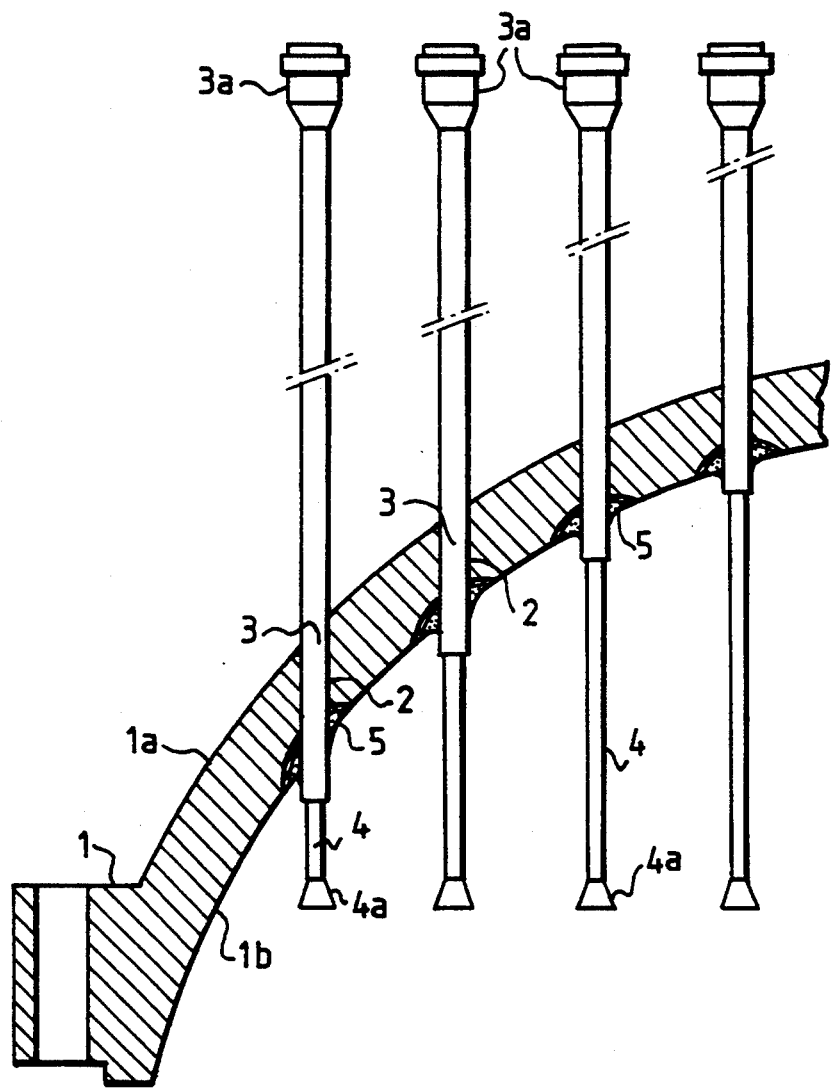
FIG. 1 is a view, in partial cross-section through a vertical plane, of the vessel head of a pressurized-water nuclear reactor.

FIG. 1 shows the head 1 of a vessel of a pressurized water nuclear reactor, having a hemispherical shape and including a convex outer surface 1a and a concave inner surface 1b.

The head 1 has been shown in the position which it occupies when it is laid on the mating surface of the nuclear-reactor vessel or on an inspection and repair stand.

The head 1 is penetrated by openings 2, the axes of which are parallel and of vertical direction, in the of the head shown in FIG. 1.

An adaptor 3 of tubular shape is fixed inside each of the openings 2, the adaptor including a widened upper portion 3a to which it is possible to fix a mechanism for moving a rod for controlling the reactivity of the reactor, or a device for bearing and for gripping a thermocouple column assembly (not shown in FIG. 1).

Inside the adaptors providing the penetration of a drive shaft of a rod for controlling the reactivity are also disposed thermal sleeves such as 4 which rest by means of a widened upper portion on a bearing surface inside the portion 3a of the adaptor.

The adaptors 3 have a nominal outer diameter slightly greater than the diameter of the openings 2 and are shrink-fitted with nitrogen inside the openings 2 and are then fixed in a sealed manner by means of an annular weld 5 deposited inside a bevel machined in the concave inner surface 1b of the vessel head 1.

The thermal sleeves 4 include a portion projecting in relation to the lower portion of the adaptor carrying a flared engagement cone 4a providing the reinsertion of the drive shafts of the control rods into the adaptors, while the head 1 is being laid on the vessel mating surface.

The flared portions 4a of all the adaptors for penetration of the drive shafts are located at the same level in the vertical direction, while the lower end portions of the adaptors are located at different levels depending on their position on the vessel head, on account of the hemispherical shape of the head.

The adaptors for penetrating the vessel heads of pressurized-water nuclear reactors are generally made of a nickel alloy, the vessel head itself being made of steel. A "buttering" layer made of stainless steel is deposited on the concave inner surface 1b of the vessel head in the bottom of the bevels in which the welds 5 for fixing the adaptors are deposited.

After the nuclear reactor has been operated for a certain time, it is noticeable that some of the adaptors are liable to have cracks, in particular in the area of the welds 5 on the vessel head.

In some cases, it is necessary to change completely the adaptor which has a crack, so as to be able to guarantee perfect safety of the vessel head during the operation of the nuclear reactor.

Figure 2:
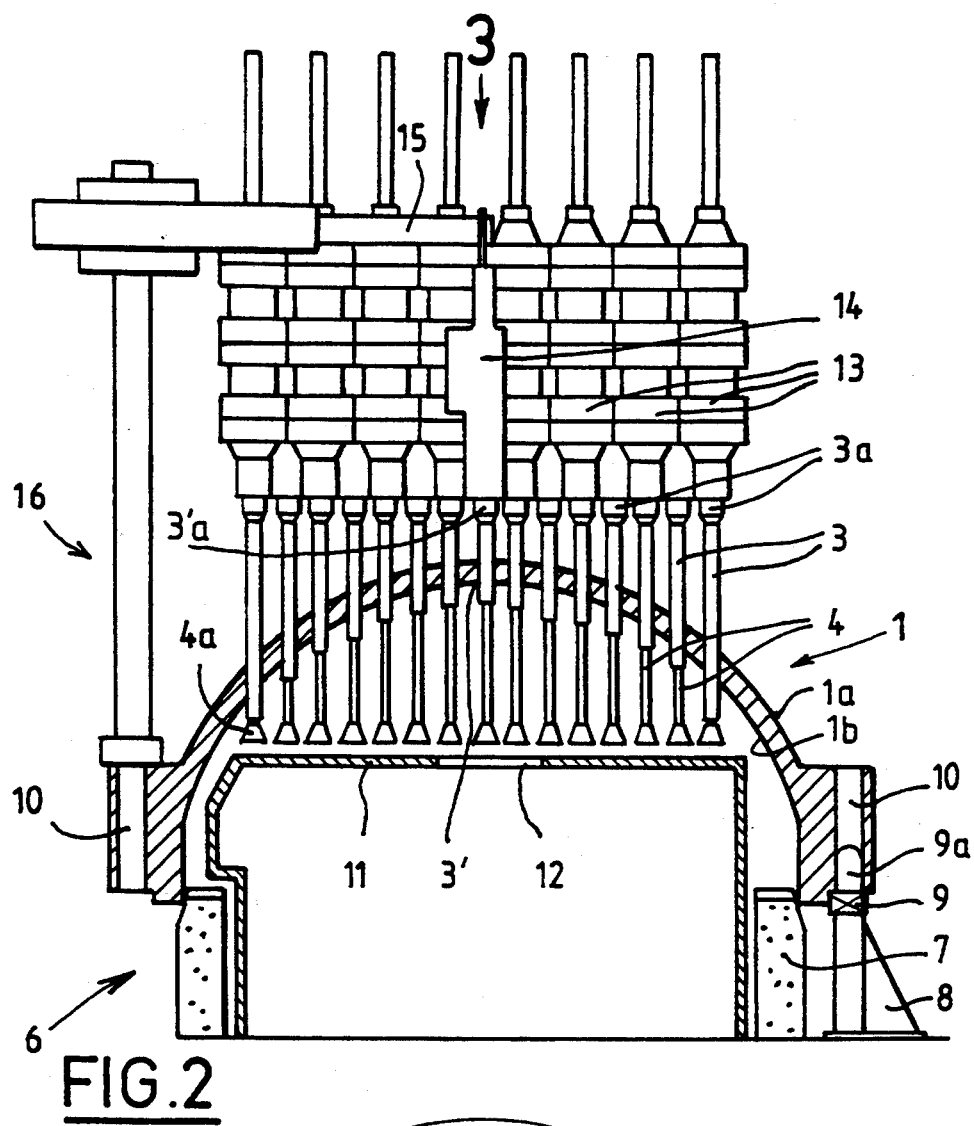
FIG. 2 is a view, in elevation and in cross-section, of a vessel head during an operation for replacing a penetration adaptor.

In order to carry out such a replacement, the head is placed on a repair stand 6, such as shown in FIG. 2.

The head 1 rests on a support block 7 of the repair stand, so that its convex upper surface 1a faces upwards and its concave lower surface 1b faces downwards and towards the interior of the repair station 6.

The support block 7 includes, in particular, walls 8 of radial direction in relation to the head 1, to which walls columns 9 are fixed whose upper end 9a constitutes a pin for engagement of a passage opening 10 of a stud for fixing the vessel head 1.

The repair station 6 also includes a biological-shield chamber 11, the upper portion of which constitutes a horizontal mechanism plate located immediately beneath the engagement cones 4a of the thermal sleeves 4 disposed inside the adaptors 3 providing the passage of a drive shaft of a control rod.

The biological shield 11 enables some operations to be carried out beneath the lower surface 1b of the head, through an opening such as 12, despite the significant radioactivity of the inner lower face of the head 1.

FIG. 2 shows the head 1 after it has been deposited on the repair stand 6, in an initial phase of the method of replacing an adaptor 3' placed in a central position on the vessel head.

Figure 3:
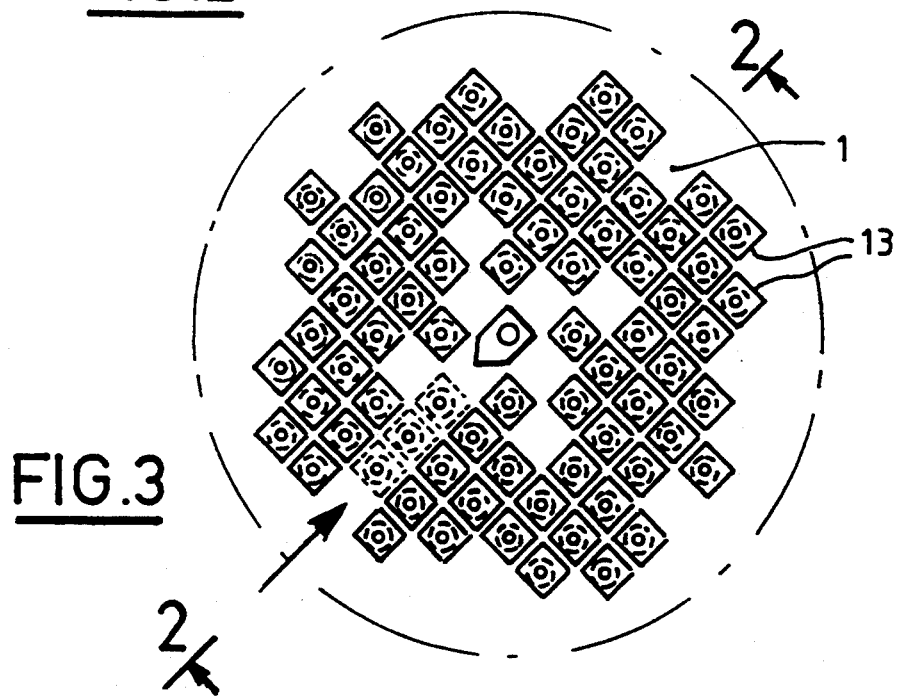
FIG. 3 is a plan view along 3 of FIG. 2.

The mechanisms 13 fixed to the upper end portions 3a of the adaptors 3 are disposed side-by-side and in a lattice having square lattice cells, as may be seen in FIG. 3.

Prior to a repair on an adaptor, such as the adaptor 3', in order to replace it by a new adaptor, it necessary to dismount the mechanism 13 of this adaptor 3' as well as the thermal sleeve disposed inside the adaptor.

These operations are performed from above the head, which has advantages as regards the dimensions of the repair tools to be used and the simplicity of the implementation of the replacement operation; the costs relating to replacement are consequently reduced.

In order to replace the adaptor 3', it is necessary to machine some portions of the adaptor and of the inner surface 1b of the head.

In order to do this, a machine 14 is used which rests on and is fixed to the upper portion 3'a of the adaptor 3' being replaced and at the end of a telescopic arm 15 by means of its upper end portion so as to be held in a stable manner, during the machining operations, in the extension of the adaptor 3'.

The telescopic arm 15 constitutes an element of a support jib 16 which is engaged and fixed in an opening 10 intended for the passage of a stud for fixing the vessel head 1.

In order to install the arm 15 between the mechanisms 13 of the adaptors of a row of radial direction in relation to the head 1, the mechanisms 13 of three adaptors of the radial row are dismounted, the locations of these mechanisms 13 which have been dismounted being shown by the broken lines in FIG. 3, and thus access is gained to the central adaptor 3' from the edge of the head.

It is obvious that, in the case of replacing an adaptor located on the periphery of the head, it is not necessary to dismount the mechanisms of other adaptors.

In general, it is possible to dismount any number of mechanisms in order to make it easier to have access to the adaptor being replaced.

Figure 4:
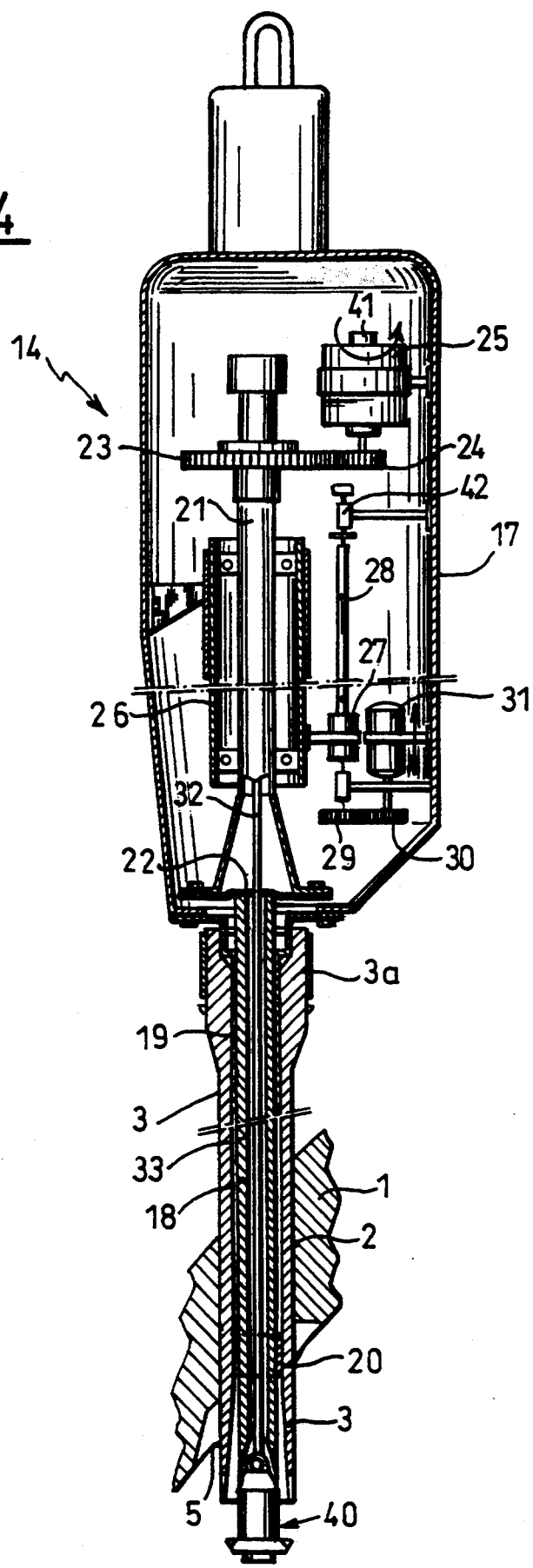
FIG. 4 is a view, in cross-section through a vertical plane, of a machining device inserted into an adaptor for penetrating the vessel head in order to perform machining within the scope of an operation for replacing the adaptor.
Figure 7:
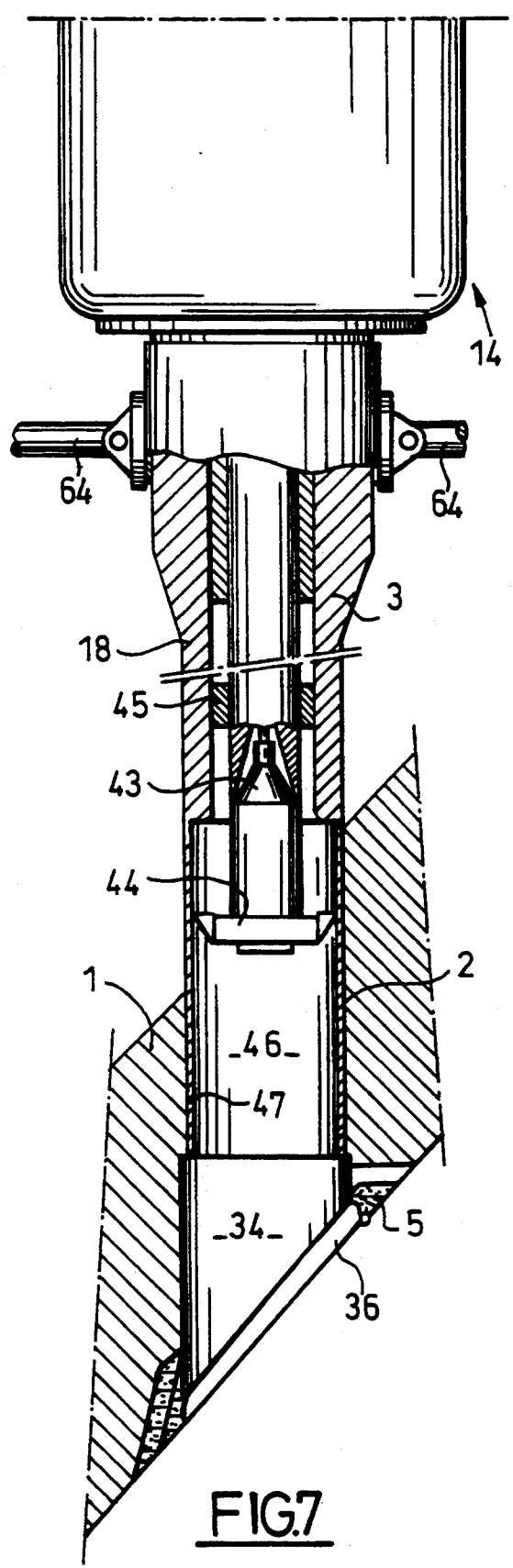
FIG. 7 is a view, in elevation and in cross-section, of a device for machining the upper portion of an adaptor to be replaced.

As may be seen in FIG. 4, which shows an embodiment of the machine given solely by way of non-limiting example, the machine 14 can include a casing 17 and a column 18 mounted so as to rotate about its axis in relation to the casing 17, in the downward extension of the casing 17.

The casing 17 includes a tubular lower portion 19 which can be engaged in the upper portion of an adaptor 3 virtually without clearance in order to hold the casing 17 on the upper portion 3a of the adaptor 3 which includes a bore having a shoulder on which the tubular support 19 rests.

Furthermore, the column 18 of the machine 14 includes a ring 20 in which the column 18 is mounted so as to rotate and which enables the column 18 to be guided along the axial direction inside the adaptor 3.

The column 18 is also mounted so as to rotate and to slide inside the tubular support 19 of the casing 17.

Inside the casing 17, mounted so as to rotate in an axial direction aligned with the direction of the axis of the adaptor 3, is a tubular shaft 21 connected via a mechanism plate 22, at its lower portion, to the upper end of the column 18.

The tubular shaft 21, which is mounted inside rolling bearings, is rigidly attached to a drive pinion 23 which meshes with a pinion 24 fixed to the output shaft of a geared motor 25 mounted in the casing 17.

In this manner, the tubular shaft 21 and the column 18 can be driven rotationally about their common axis.

The tubular shaft 21 is splined on the outside and is engaged in a ring which includes corresponding internal splines, this ring being rigidly attached to the pinion 23 and mounted so as to rotate in the casing 17 by means of a rolling bearing. In this manner, the tubular shaft 21 is rotationally integral with and translationally free to move axially in relation to the pinion 23.

The tubular shaft 21 is mounted so as to rotate in a tubular support 26 which is itself mounted so as to slide in the axial direction inside the casing 17.

The tubular support 26 carries on the outside a nut 27, the axis of which is parallel to the axis of the tubular shaft 21.

A screw 28, meshing with the nut 27 and directed along the axial direction, is mounted so as to rotate in the casing 17 and is rigidly attached at its end to a pinion 29 meshing with a pinion 30 fixed to the output shaft of a geared motor 31.

The geared motor 31 rotates the screw 28 which drives the tubular support 26 and the shaft 21 in axial translational movement by means of the nut 27.

A pneumatic cylinder 32 disposed inside the tubular shaft 21 includes a rod connected, via a coupling bar 33 disposed inside the tubular column 18, to a boring tool 40 which engages in the end portion of the column 18 so as to be rotationally integral with the column 18.

It is thus possible to drive the tool 40 rotationally and to move it axially, so as to machine the lower end portion of the adaptor 3 and a portion of the weld 5.

The machining is performed by rotating the tool 40, using the geared motor 25, and by translationally moving this tool in the axial direction, by means of the column 18, using the geared motor 31.

In addition, the tool is held by the coupling bar 33 connected to the rod of the pneumatic cylinder 32.

After the installation of the machining device 14, as shown in FIGS. 2 and 3, the lower portion of the column 18 is equipped with a tool 40 making it possible to mill the lower portion of the adaptor 3 and to rebore the weld 5 and a portion of the penetration opening 2 of the vessel head 1.

The boring tool 40 is fixed to the end of the column 18, from inside the biological-shield chamber 11 shown in FIG. 2, through the opening 12. This operation can be performed very rapidly, the tool 40 including means for rapid assembly to the end of the column 18 and to the bar 33 rigidly attached to the rod of the cylinder 32.

As may be seen in FIG. 5, in which the members equipping the machine 14 have been shown in the position which they occupy after completing the machining of the lower portion of the adaptor, the bore diameter of the tool 40 is slightly greater than the external diameter of the adaptor 3 and than the nominal diameter of the opening 2.

The bore 34 formed by the tool 40 makes it possible to remove completely, in the form of chips, the lower portion of the adaptor 3 up to a certain level inside the head 1, a portion of the weld 5 in contact with the external wall of the adaptor and, possibly, a thin inner skin of the penetration opening 2 for the adaptor.

After the bore 34, as shown in FIG. 5, has been formed, the tool 40 is dismounted and a measurement device is mounted on the end of the column 18 from beneath the biological-shield chamber 11.

The measurement tool is used to determine, in an extremely precise manner, the position of the lower surface of the weld 5 remaining, so as to adjust an operation for machining a welding bevel, inside the weld 5, for fixing the replacement adaptor. In particular, the position of a point constituting the reference and the origin for starting the machining of the bevel is determined in a very precise manner.

FIG. 6 shows a tool 35 for machining a bevel in the metal of the weld 5, so as to weld the replacement adaptor.

The machining tool 35 is mounted on the end of the column 18 of the machine 14, from inside the biological-shield chamber 11, through the opening 12.

Depending on the previously determined reference and origin position, the machining tool 35 is adjusted in order to commence the machining of the bevel 36.

The machining tool 35 includes a milling head 37 fixed to the output shaft of a geared motor 38 mounted on the support for the tool 35.

The tool 35 includes means 39 for adjusting the position of the milling head 37 by means of pinions.

The bevel 36 has to be formed in a position inclined in relation to the horizontal plane and with a complex shape which depends on the shape of the weld 5 filling the original bevel machined around the penetration opening 2, in the metal of the head 1.

Depending on the distance of the adaptor 3 from the axis of the head 1, the bevel filled by the weld 5 is inclined to a greater or lesser extent and has a shape which is complex to a greater or lesser extent, which makes it necessary to adapt the conditions for machining the bevel 36 inside the weld 5 to the position of the adaptor 3.

The tool 35 and the milling head 37 are rotated about the axis of the adaptor 3 and the milling head 37 is moved simultaneously and in an adjusted manner in the axial direction of the adaptor 3, in order to follow the surface of the weld 5 in which the bevel 36 is machined.

These movements are controlled by coders, such as 41 and 42, associated with the means for moving the column 18, at the end of which is fixed the tool 35 which can be adjusted, prior to the machining operation, by using the means 39.

After having machined the bevel 36, the tool 35 is dismounted and the machine 14 is equipped with a boring bar 43 carrying, at its end, a boring head 44.

The boring bar 43 is mounted so as to rotate and to slide in the axial direction inside the bore of the adaptor 3 by means of a bearing 45.

The boring head 44 forms a bore 46 inside the upper portion of the adaptor, the diameter of which is slightly less than the external diameter of the adaptor 3, so that, after boring the upper portion of the adaptor, a thin tubular wall 47 is left inside the opening 2 penetrating the vessel head 1.

In an advantageous manner, the thickness of the residual wall 47 is very small and, for example, is of the order of 0.5 mm.

Attached to the machine 14 are means 64 for laterally holding the upper portion of the adaptor 3, which is no longer held in the opening 2, after completing the reboring, except by the wall 47. The means for holding the machine and the adaptor enable rupture or bending of the thin wall 47, still engaged in the opening 2, to be prevented.

The wall 47 remains held by shrink-fitting inside the opening 2, so that the adaptor 3 to be replaced cannot be completely extracted without the risk of causing a tensile rupture of the wall 47 or damage to the inner wall of the opening 2.

Before extracting the thin wall 47, this wall is deformed, from above the head, by using compression cylinders engaging with the outer surface of the wall 47, in its portion located on the outside and just above the head 1.

A compressional deformation is achieved by inwardly pushing-in the wall 47, so as to stress-relieve it and to disbond it from the wall of the opening 2, so that it can be extracted very easily without damaging the surface of the bore.

The opening 2 penetrating the head 1 can then receive a replacement adaptor which is inserted and installed inside the opening 2 at liquid-nitrogen temperature. The replacement adaptor is held in position in the opening 2 as it heats up, the corresponding expansion resulting in the replacement adaptor shrink-fitting inside the opening 2.

Figure 8:
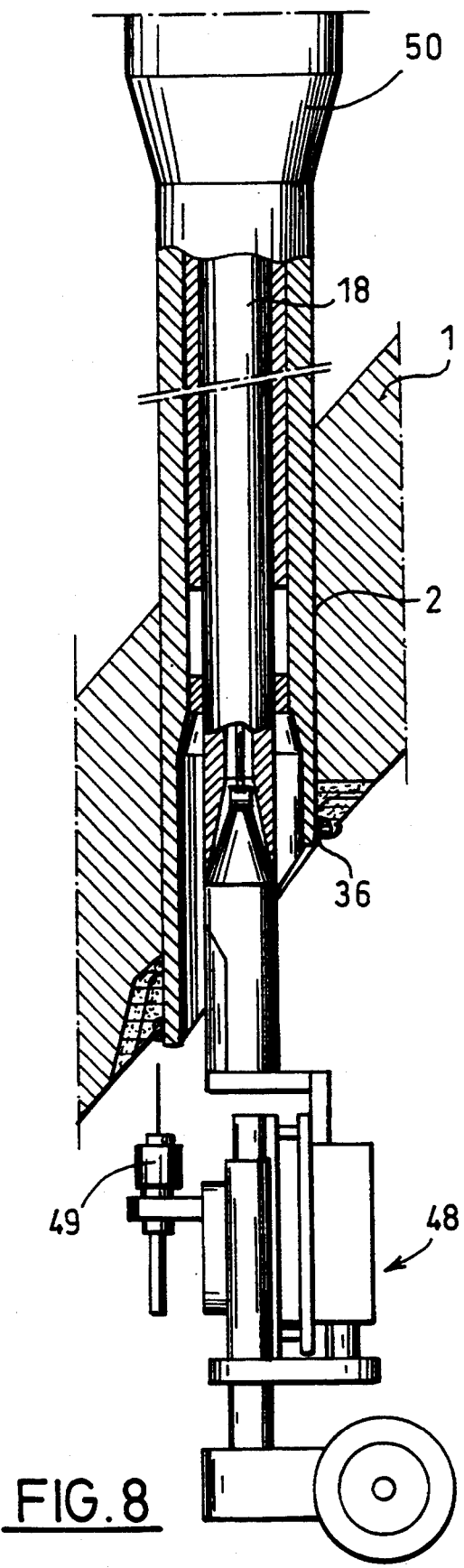
FIG. 8 is a view, in elevation and in cross-section, of a machine for welding a replacement adaptor.

FIG. 8 shows the replacement adaptor 50 in position inside the penetration opening 2 of the head 1 and held by shrink-fitting with nitrogen.

Also shown is the machine 14 which has been installed on the adaptor 50, so that its column 18 is mounted so as to rotate and to slide in the axial direction inside the bore of the replacement adaptor 50.

An automatic TIG welding machine 48 is fixed, from beneath the head, to the end of the column 18, enabling the bevel 36 to be filled with filler metal in order to perform the welding and to seal around the adaptor 50.

The bevel 36 has been machined with a cross-section such that it can be filled by successive welding beads superimposed on each other in the axial direction. Such welding is usually designated by the name of narrow-bevel welding.

As mentioned in a previous Patent Application of the FRAMATOME Company, filed under the number FR-A-93/00980, such narrow-bevel welding, in the case of an adaptor whose bevel 36 is inclined, has to be performed by varying the speed of rotation of the welding head 49 about the axis of the adaptor during the welding, so as to provide a constant rate of deposition of the filler metal.

In addition, the welding head has to be simultaneously moved rotationally and translationally along the axial direction of the adaptor 50 in order to follow the shape of the welding bevel 36.

Adjustment of the movements of the welding head 49 can be provided by the means for controlling the machine 14.

FIG. 9 shows a variant of the welding device used for filling the bevel 36.

The welding machine 51 is suspended from a support part 52, the upper portion 52a of which constitutes a rotation spindle mounted inside a bearing 53 which can be fixed and locked in the bore of the adaptor 50, this mounting being able to be carried out from beneath the head, from inside the biological-shield chamber 11.

The spindle 52a is connected to the output shaft of a geared motor 54 fixed to the support of the bearing 53. The geared motor 54 includes control means enabling its speed of rotation to be varied and adjusted during the welding.

A slideway 56, on which a slide 57 carrying a TIG welding head 59 is mounted so as to move in the vertical direction, is mounted on the support 52 by means of an adjustment device 55.

The slide 57 also carries a support 60 to which are fixed a reel 58 for supplying the head 59 with filler-metal wire and means for fastening the cable 61 for supplying the welding head with electric current.

FIG. 10 shows the lower portion of the replacement adaptor 50, following the welding operation which has just been described.

A weld bead 62 made of filler metal has been deposited in the bevel 36 machined in the metal of the weld 5. A gap 63 exists above the weld 62, between the external surface of the adaptor 50 and the internal surface of the bore 34, so that the bore 34 is slightly greater than the opening 2. Despite the presence of this gap 63, the adaptor 50 is fixed perfectly by shrink-fitting and by means of the weld 62.

As may be seen in FIG. 10, the bore 34 is machined over an axial length of the opening 2 such that the adaptor 50 is nowhere in contact with the remaining portion of the weld 5 of the adaptor which has been replaced.

The method according to the invention makes it possible to perform all the operations necessary for the replacement from an area located above the head 1, with the exception of operations for mounting and dismounting the tools, which are performed from the biological-shield chamber beneath the head.

Furthermore, the adaptor can be replaced in a simpler and more rapid manner than by having access to the adaptor from beneath the head.

The invention is not limited to the embodiment which has just been described.

It is thus possible to use tools having a shape other than those which have been described for performing the various machining or welding operations.

The invention applies to the replacement of any adaptor for penetrating the vessel head of a nuclear reactor.

We claim:

1. Method of replacing an adaptor (3) for penetrating the vessel head (1) of a nuclear reactor, of rounded shape, disposed, after dismounting, so as to have a convex outer surface (1a) facing upwards and a concave inner surface (1b) facing downwards, each of the adaptors (3) having a vertical disposition and being fixed in a penetration opening (2) in the head (1) by means of a weld (5) in the vicinity of the concave inner surface (1b)

and carrying an item of equipment (13, 4) resting on one end of the adaptor (3, 3'), this end projecting outside the head (1), the method consisting in machining a lower portion of the adaptor (3) to be replaced, in the vicinity of the inner surface (1b) of the head (1), and at least one portion of the weld (5) for fixing the adaptor (3), in extracting the adaptor (3) to be replaced from the opening in the head (1), in inserting a replacement adaptor (50) into the opening and fixing it therein, and in welding the replacement adaptor (50) to the head, characterized in that the replacement is performed from a repair area located above the convex face (1a) of the head and in that at least one of the operations of machining the adaptor to be replaced (3') after dismounting the item of equipment (4, 13) resting on its upper end and of welding the replacement adaptor (50) is carried out by inserting a repair means (14) via the upper end of the adaptor (3, 50).

2. Method according to claim 1, characterized in that the item of equipment resting on the upper part (3a) of the adaptor to be replaced (3') is constituted by a mechanism (13) for driving a reactivity control rod and by a thermal sleeve (4) disposed inside the adaptor (3).

3. Method according to claim 2, characterized in that, in order to install the repair means (14) in the adaptor to be replaced (3'), at least one drive mechanism (13) resting on an adaptor (3) other than the adaptor (3) being replaced is dismounted.

4. Method according to any one of claims 1 to 3, characterized in that a portion of the repair means (14) is mounted from beneath the head, in a manual manner, from inside a biological-shield chamber (11).

5. Method according to any one of claims 1 to 3 characterized in that the lower portion of the adaptor to be replaced (3) and a portion of the weld (5) are removed by machining by means of a boring tool (40).

6. Method according to any one of claims 1 to 3, characterized in that a narrow bevel (36) is machined in the metal of the weld (5), after removal by machining of the lower portion of the adaptor (3) to be replaced and of a portion of the weld (5).

7. Method according to claim 6, characterized in that a weld is formed by deposition of filler metal in the narrow bevel (36) using a welding head (49, 59) rotating at a speed which can be varied during the welding.

8. Method according to any one of claims 1 to 3, characterized in that, after removal by machining of the lower portion of the adaptor (3) and of a portion of the weld (5) of the adaptor to be replaced, that portion of the adaptor (3) remaining inside the opening (2) of the head is rebored.

9. Method according to claim 8, characterized in that, after reboring the remaining portion of the adaptor (3), a wall (47) of the adaptor (3), obtained after reboring, is compressed so as to separate the wall (47) from the penetration opening (2) of the head (1).

10. Method according to claim 1, characterized:
in that the head (1) is positioned on a repair stand (6) with its convex outer surface facing upwards;
in that the item of equipment (4, 13) resting on the upper portion of the adaptor (3, 3') being replaced is dismounted;
in that the repair means (14) is installed on the upper portion of the adaptor (3), at least one portion of which means is inserted into the bore of the adaptor (3, 3');
in that a first machining tool is fixed to that portion of the repair means (14) inserted into the adaptor (3, 3') from beneath the head (1);
in that a lower portion of the adaptor (3, 3') and a portion of the weld (5) are removed by machining;
in that the first machining tool is replaced by a second tool and in that a welding bevel (36) is machined in a remaining portion of the weld (5);
in that the second machining tool is replaced by a third tool and in that that portion of the adaptor (3, 3') remaining in the opening (2) of the vessel head (1) is rebored;
in that the rebored portion of the adaptor (3, 3') remaining in the opening (2) of the head (1) is compressed and in that the remaining portion of the adaptor (3, 3') is removed from the opening (2) in the head (1);
in that a replacement adaptor (50) is installed at a low temperature and in that it is shrink-fitted to the opening (2); and
in that the welding bevel (36) is filled with filler metal.

* * * * *